United States Patent [19]
DiRisio

[11] Patent Number: 6,052,532
[45] Date of Patent: Apr. 18, 2000

[54] ONE-TIME-USE CAMERA WITH ANTI-BACKUP PAWL ENGAGING FILM SPOOL TO PREVENT REVERSE UNWINDING ROTATION OF FILM WINDER

[75] Inventor: Anthony DiRisio, Rochester, N.Y.

[73] Assignee: Eastman Kodak Company, Rochester, N.Y.

[21] Appl. No.: 09/234,575

[22] Filed: Jan. 21, 1999

[51] Int. Cl.⁷ .............................. G03B 17/02; G03B 1/00
[52] U.S. Cl. .............................. 396/6; 396/395; 396/396; 396/411; 396/538
[58] Field of Search .............................. 396/6, 395, 396, 396/411, 413, 535, 536, 538

[56] References Cited

U.S. PATENT DOCUMENTS

| | | | |
|---|---|---|---|
| 554,769 | 8/1896 | Brownell | 242/118.62 |
| 579,949 | 4/1897 | Brownell | 396/385 |
| 1,050,785 | 1/1913 | Austin et al. | 242/118.4 |
| 1,144,267 | 6/1915 | VanSickle et al. | 396/502 |
| 1,367,268 | 2/1921 | Kessler | 396/395 |
| 4,991,786 | 2/1991 | Cloutier et al. | 396/512 |
| 5,063,400 | 11/1991 | Takei et al. | 396/6 |
| 5,202,713 | 4/1993 | Nakai et al. | 396/6 |
| 5,329,330 | 7/1994 | Sakai et al. | 396/6 |
| 5,349,410 | 9/1994 | Kamata | 396/6 |
| 5,453,804 | 9/1995 | Norris et al. | 396/31 |
| 5,517,270 | 5/1996 | Balling | 396/536 |
| 5,550,608 | 8/1996 | Smart et al. | 356/538 |
| 5,568,214 | 10/1996 | Stiehler | 396/411 |
| 5,579,070 | 11/1996 | Smart et al. | 396/538 |
| 5,581,316 | 12/1996 | Kamoda et al. | 396/6 |
| 5,581,321 | 12/1996 | Boyd | 396/535 |
| 5,608,485 | 3/1997 | Kataoka et al. | 396/514 |
| 5,640,637 | 6/1997 | Stephenson, III | 396/411 |
| 5,682,570 | 10/1997 | Wakabayashi | 396/536 |
| 5,689,745 | 11/1997 | Zander et al. | 396/429 |
| 5,694,629 | 12/1997 | Stephenson, III et al. | 396/395 |
| 5,761,542 | 6/1998 | Lamphron et al. | 396/6 |
| 5,933,665 | 8/1999 | Smart et al. | 396/348 |

*Primary Examiner*—Eddie C. Lee
*Attorney, Agent, or Firm*—Roger A. Fields

[57] ABSTRACT

A one-time-use camera having a film take-up chamber, a film spool rotatable in the film take-up chamber, a film winding thumbwheel supported for winding rotation in coaxial engagement with the film spool to similarly rotate the film spool to take up an exposed filmstrip, and an anti-backup pawl for preventing unwinding rotation of the thumbwheel, is characterized in that the anti-backup pawl engages said film spool to prevent unwinding rotation of the film spool, in order to prevent unwinding rotation of the thumbwheel. Preferably, a film door closes the film take-up chamber, and the anti-backup pawl is supported on the film door to engage the film spool.

1 Claim, 6 Drawing Sheets

ONE-TIME-USE CAMERA WITH ANTI-BACKUP PAWL ENGAGING FILM SPOOL TO PREVENT REVERSE UNWINDING ROTATION OF FILM WINDER

CROSS REFERENCE TO RELATED APPLICATION

Reference is made to commonly assigned copending application Ser. No. 09/234,954, entitled ONE-TIME-USE CAMERA WITH ANTI-BACKUP PAWL DISENGAGED FROM FILM WINDER DURING FILM LOADING and filed Jan. 21, 1999 in the name of Anthony DiRisio.

FIELD OF THE INVENTION

The invention relates generally to the field of photography, and in particular to one-time-use cameras. More specifically, the invention relates to a one-time-use camera with an anti-backup pawl for preventing reverse unwinding rotation of a film winding thumbwheel.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a film take-up chamber, an unexposed film roll prewound on a film spool in a film supply chamber from the film cartridge, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the film take-up chamber. Then, he removes the exposed filmstrip from the film cartridge to develop the negatives and make prints for the customer. At least some of the used camera parts may be recycled, i.e. reused, to remanufacture the camera.

PROBLEM

A resilient anti-backup pawl for the film winding thumbwheel engages the thumbwheel to prevent reverse rotation of the thumbwheel in a film unwinding direction when the shutter release button is manually depressed and the metering lever is pivoted out of engagement with the thumbwheel.

During original manufacture of the one-time-use camera, the filmstrip is prewound from the film cartridge onto the film spool in the film supply chamber to form the unexposed film roll on the film spool. The anti-backup pawl must then be disengaged from the thumbwheel to permit the thumbwheel to be reverse rotated in the film unwinding direction. Typically, the anti-backup pawl is held separated from the thumbwheel, and a rotation tool coaxially engaged with the film spool in the film supply chamber is rotated to prewind the filmstrip onto the film spool.

THE CROSS-REFERENCE APPLICATION

The cross-referenced application Ser. No. 09/234,954, entitled ONE-TIME-USE CAMERA WITH ANTI-BACKUP PAWL DISENGAGED FROM FILM WINDER DURING FILM LOADING discloses a one-time-use camera comprising a main body part that has a film take-up chamber adapted to receive a film spool and a film supply chamber for an unexposed film roll, a film winding thumbwheel supported for winding rotation in engagement with the film spool to similarly rotate the film spool to take up an exposed filmstrip, and an anti-backup pawl normally engaging the thumbwheel to prevent unwinding rotation of the thumbwheel and disengageable from the thumbwheel to allow unwinding rotation of the thumbwheel to permit the film spool to be similarly rotated to unwind a fresh unexposed filmstrip from the film spool to form the unexposed film roll. The film take-up chamber is configured to allow the film spool to be received in the film take-up chamber in a film unwinding position for unwinding rotation of the film spool and to be in a different film winding position for winding rotation of the film spool. An actuator is movable to disengage the anti-backup pawl from the thumbwheel, and is located to be moved to disengage the anti-backup pawl from the thumbwheel in response to the film spool being received in the film take-up chamber in the film unwinding position and not when the film spool is in the film take-up chamber in the film winding position.

SUMMARY OF THE INVENTION

According to one aspect of the invention, a one-time-use camera comprising a film take-up chamber, a film spool rotatable in the film take-up chamber, a film winding thumbwheel supported for winding rotation in coaxial engagement with the film spool to similarly rotate the film spool to take up an exposed filmstrip, and an anti-backup pawl for preventing unwinding rotation of the thumbwheel, is characterized in that:

the anti-backup pawl engages said film spool to prevent unwinding rotation of the film spool, in order to prevent unwinding rotation of the thumbwheel.

Preferably, a film door closes the film take-up chamber, and the anti-backup pawl is supported on the film door to engage the film spool.

According to another aspect of the invention, a method of assembling a one-time-use camera comprises:

inserting a film spool through a loading opening into a film take-up chamber and positioning the film spool in rotational coaxial engagement with a film winding thumbwheel to make the film spool and the thumbwheel rotate similarly;

rotating the film spool in engagement with the thumbwheel to unwind an unexposed filmstrip from the film spool and form an unexposed film roll in a film supply chamber; and placing a film door with an anti-backup pawl over the loading opening to close the film take-up chamber and to locate the anti-backup pawl in the chamber in engagement with the film spool to prevent unwinding rotation of the film spool, in order to prevent unwinding rotation of the thumbwheel.

DETAILED DESCRIPTION OF THE INVENTION

Figure 1:
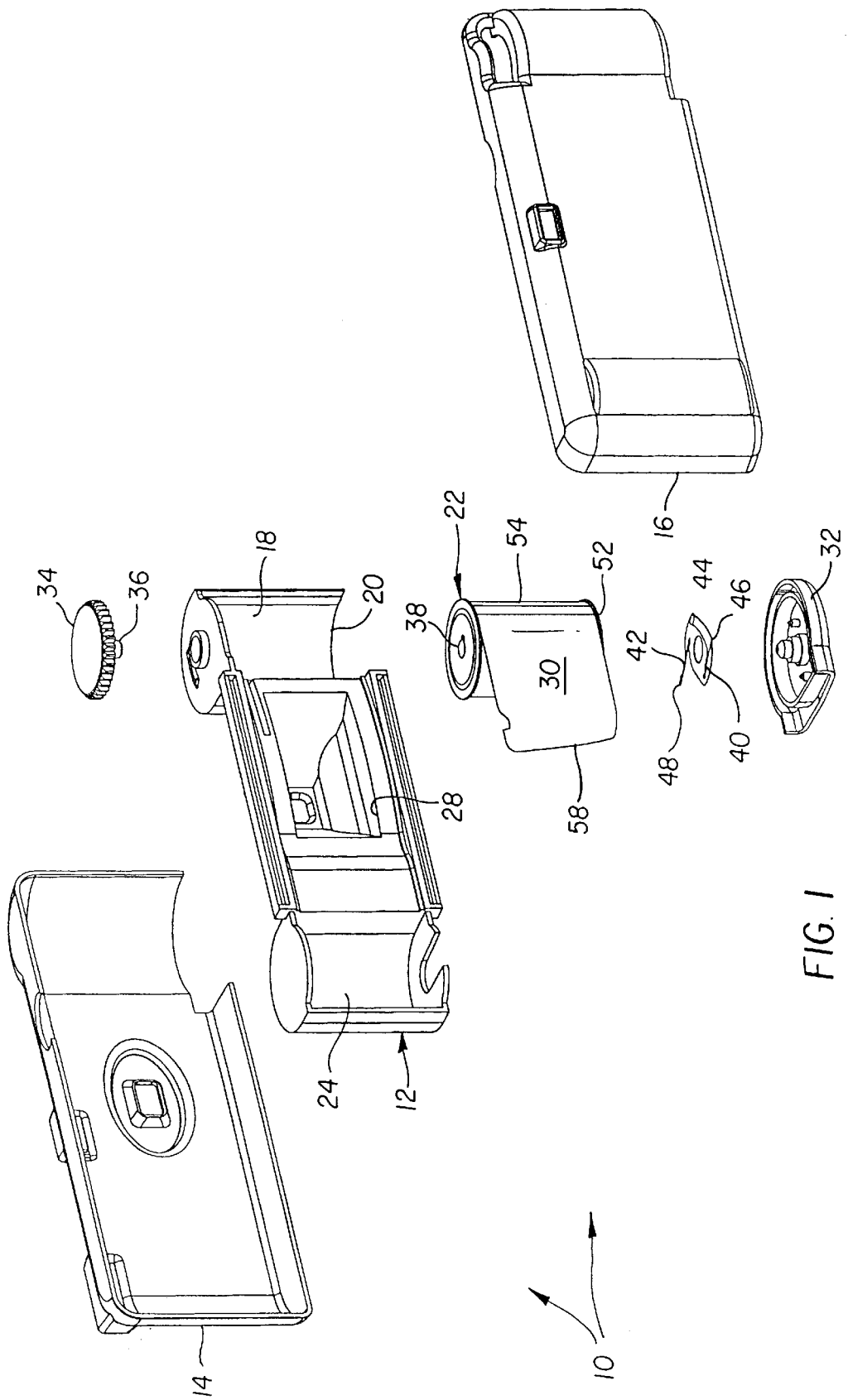
FIG. 1 is an exploded rear perspective view of a one-time-use camera consistent with a preferred embodiment of the invention.
Figure 2:
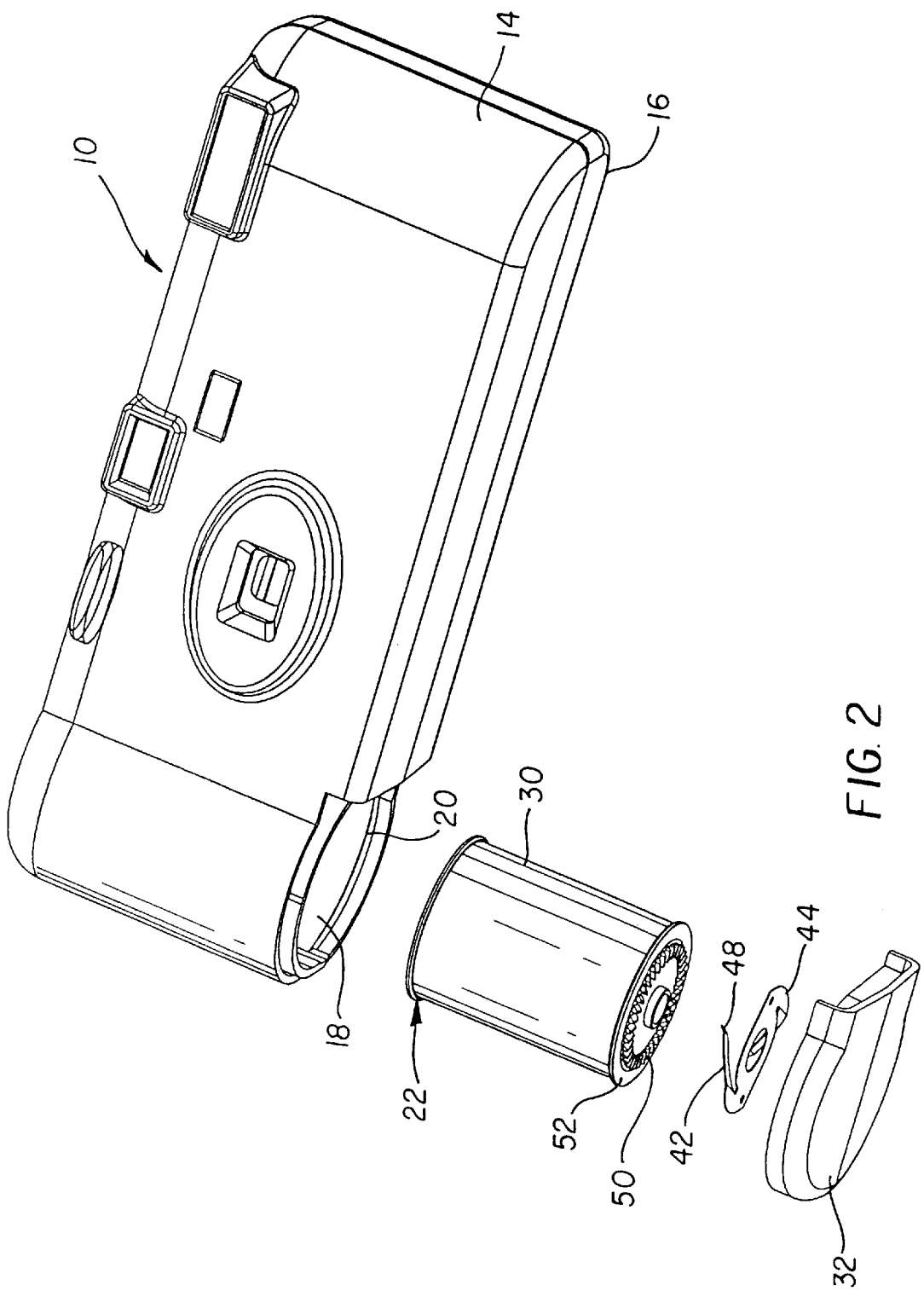
FIG. 2 is a partially assembled front perspective view of the camera.
Figure 3:
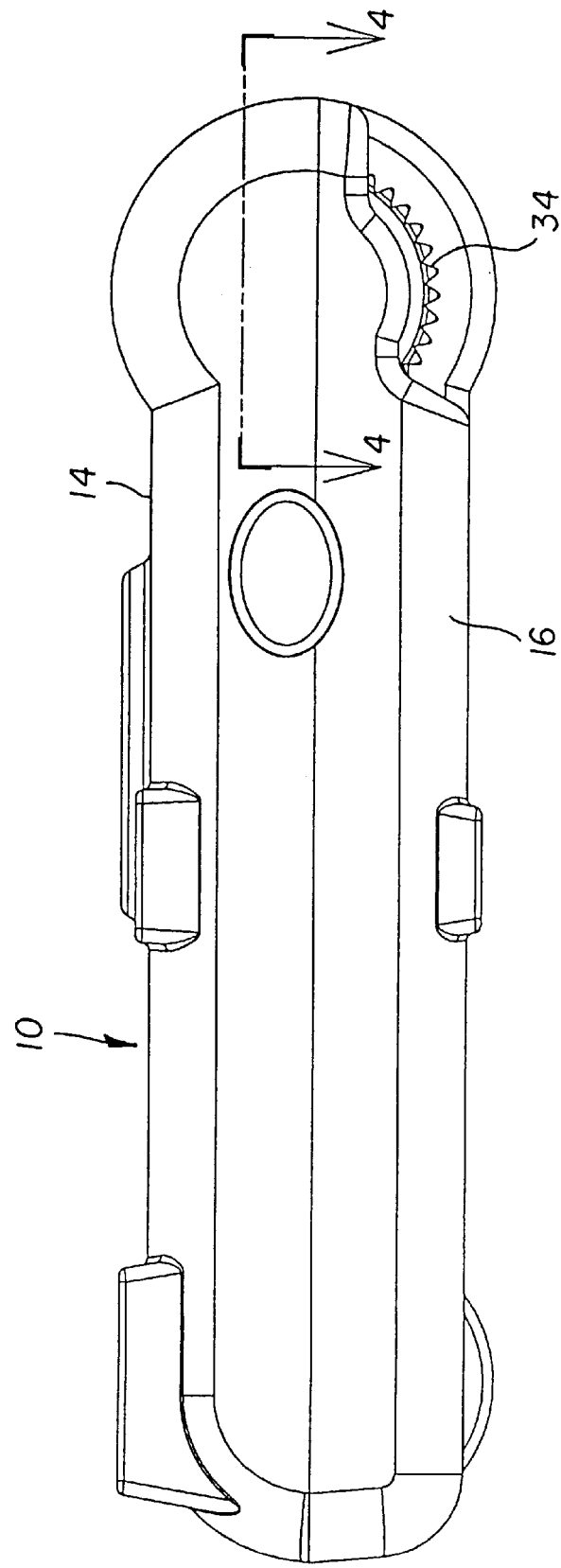
FIG. 3 is a top plan view of the camera.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–6 show a one-time-use camera 10 in which an opaque plastic main body part 12 is housed in a pair of opaque plastic front and rear cover parts 14 and 16. The front and rear cover parts 14 and 16 are connected to one another and to the main body part 12 via known hook-in-hole connections (not shown).

The main body part 12 has a film take-up chamber 18 with a bottom loading opening 20 through which a film spool 22 is inserted into the chamber, a film supply chamber 24 for an unexposed film roll 26, and a backframe opening 28 located between the film take-up chamber and the film supply chamber for exposing successive imaging sections of a filmstrip 30. See FIGS. 1, 2 and 5. An end cap or bottom lid 32 is releasably connected to the main body part 12 over the bottom opening 20 to close the film take-up chamber 18. A film winding thumbwheel 34 is rotatably supported on the main body part 12 and has a depending coaxial stem 36 received in an end opening 38 of the film spool 22 to rotationally engage the film spool. Manual winding rotation of the thumbwheel 34 (counter-clockwise in FIG. 1) similarly rotates the film spool 22 to ind each exposed section of the filmstrip 30 onto the film spool.

Figure 6:
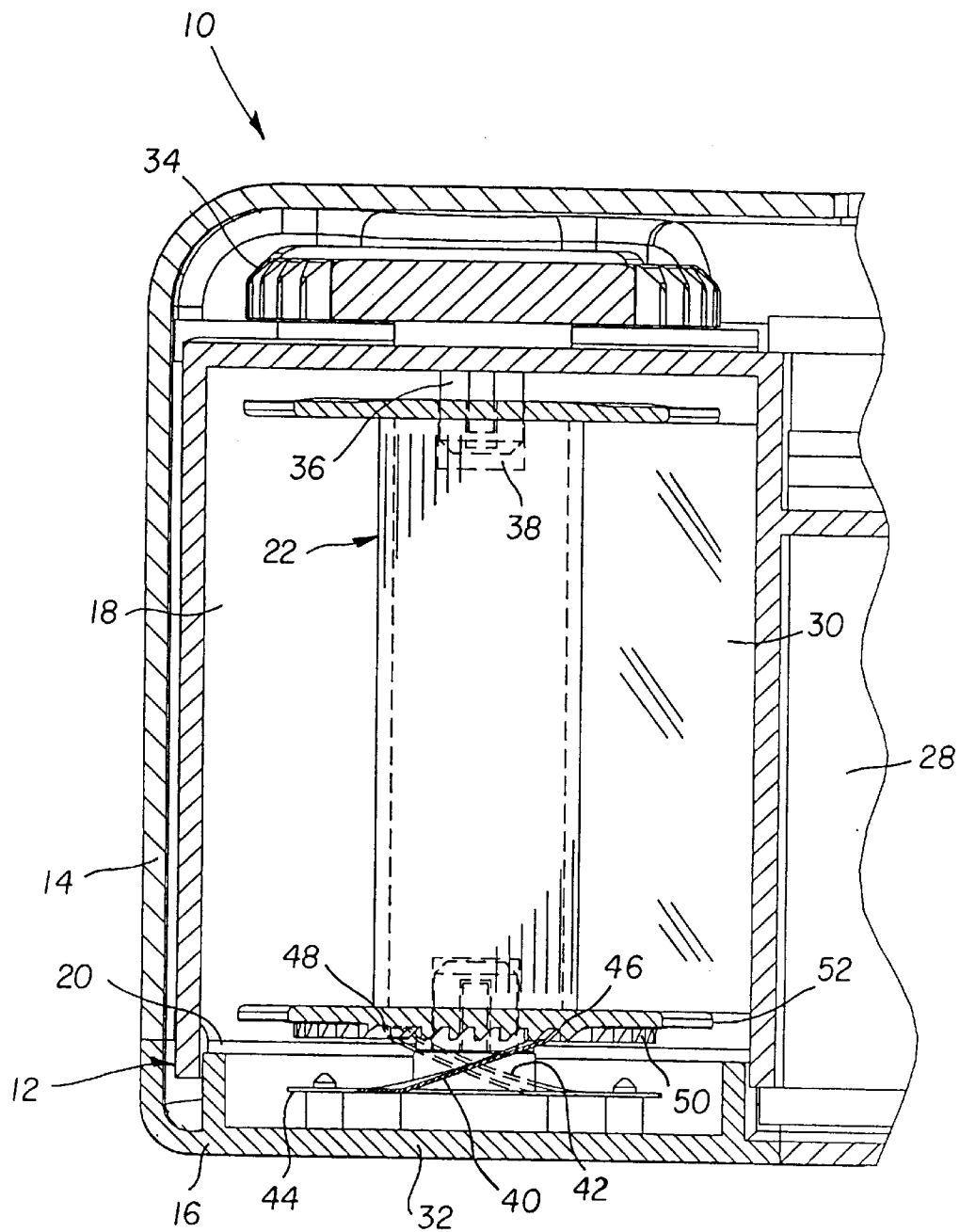
FIG. 6 is a sectional view as seen in the direction of the arrows in FIG. 4, showing an anti-backup pawl on a film door engaged with the film spool to prevent unwinding rotation of the thumbwheel.

A pair of resilient anti-backup pawl 40 and 42 are supported in antilever fashion on a base plate 44 that is attached to the inside of the end cap 32. When the end cap 32 is connected to the main body part 12 over the bottom opening 20 to close the film take-up chamber as shown in FIG. 6, respective pawl ends of 46 and 48 of the anti-backup pawls 40 and 42 engage individual teeth 50 arranged in a circular array on a bottom end flange 52 of the film spool 22. The pawl ends 46 and 48 prevent unwinding rotation of the film spool 22, in order to prevent unwinding rotation of the thumbwheel 34 (clockwise in FIG. 1).

A method of loading fresh film in the one-time-use camera 10 begins with the front cover part 14 connected to the main body part 12, and the rear cover part 16 and the end cap or bottom lid 32 separated from the main body part. The method in sequential steps is as follows.

1. An unexposed film roll 54 is wound onto the film spool 22 and the film spool with the unexposed film roll is inserted through the bottom loading opening 20 into the film take-up chamber 18.

Figure 4:
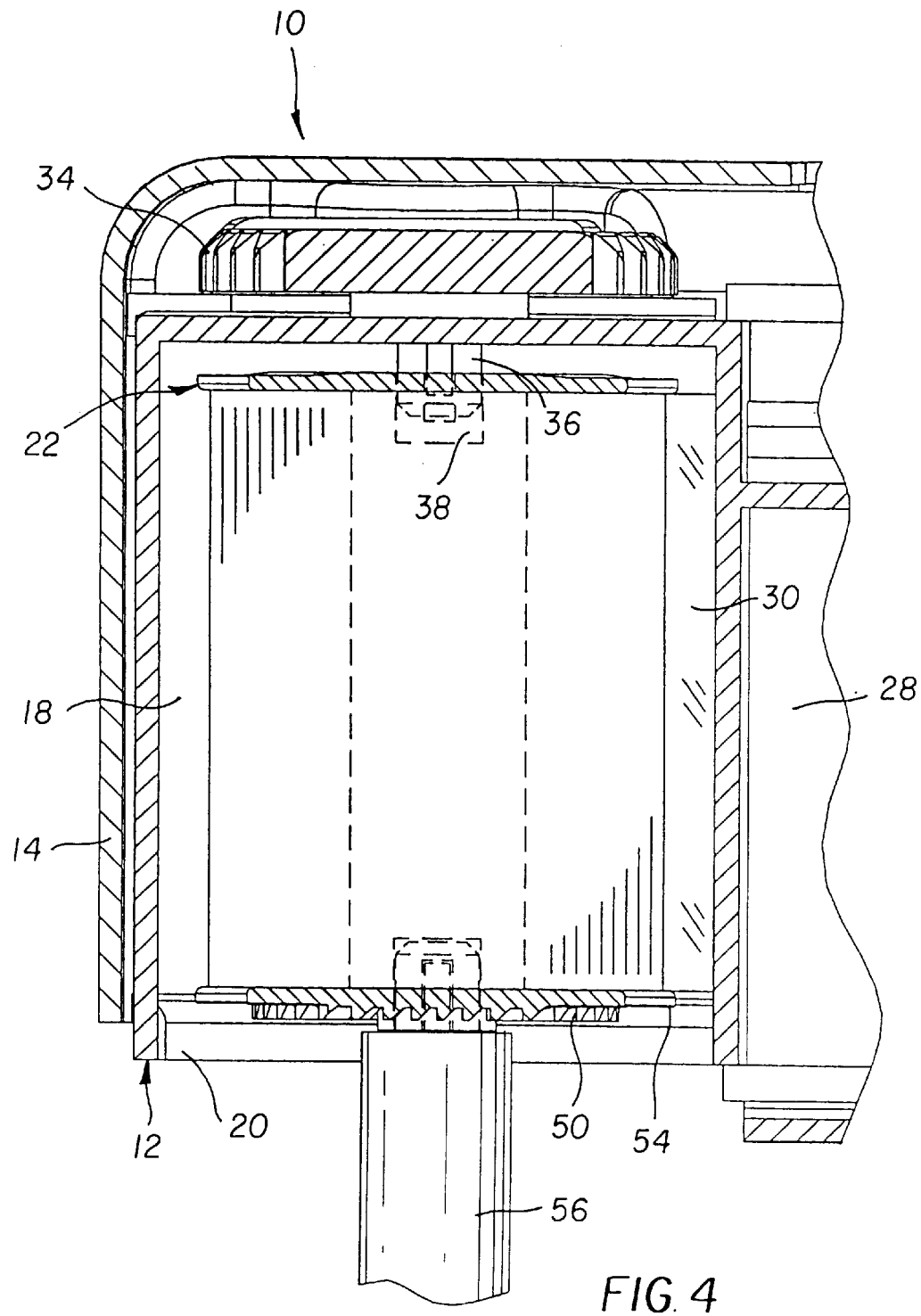
FIG. 4 is a sectional view as seen in the direction of the arrows in FIG. 3, showing a film spool rotationally engaged with a film winding thumbwheel in a film take-up chamber of the camera.
Figure 5:
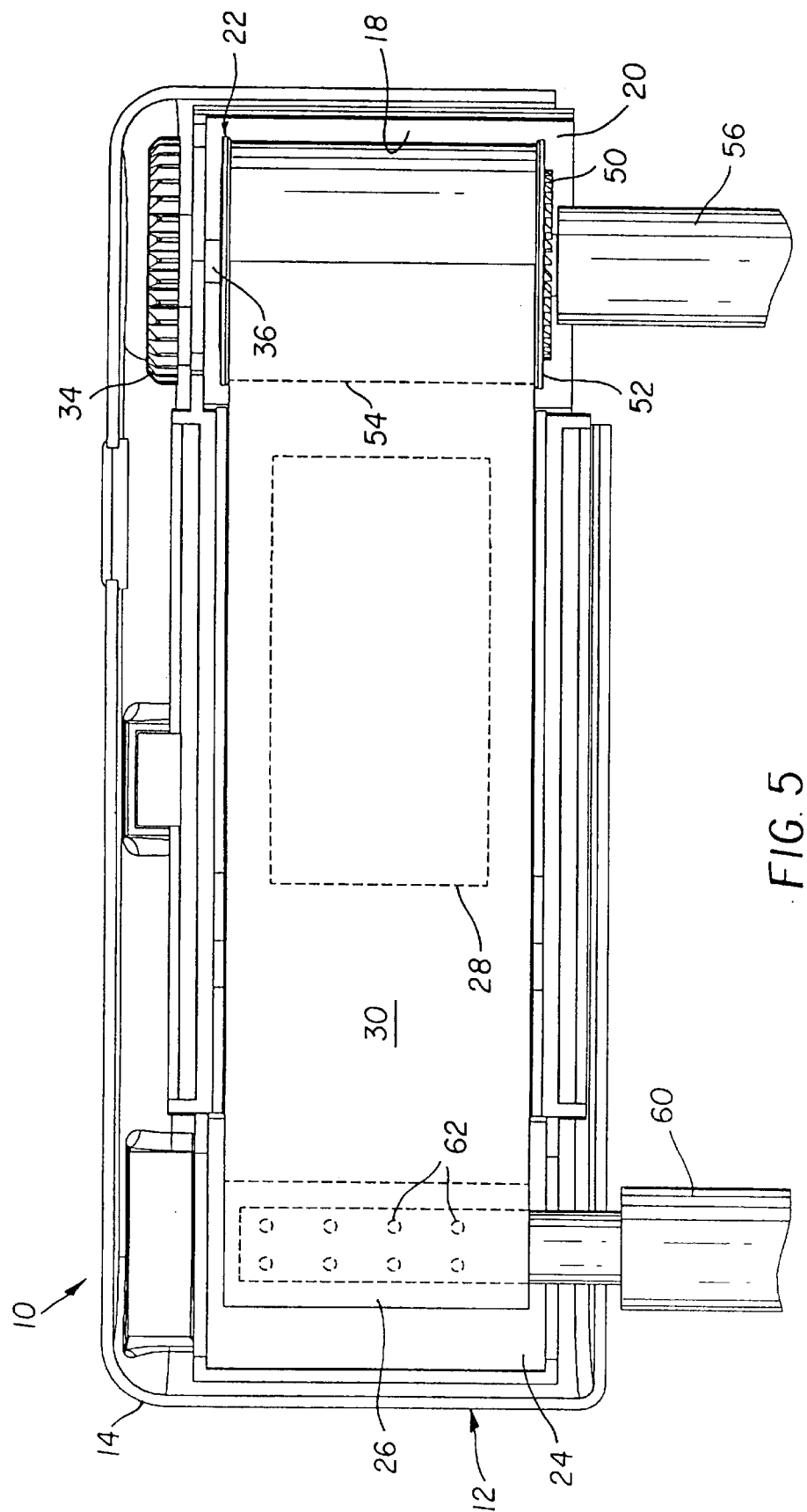
FIG. 5 is a rear elevation view of the camera with a rear cover part removed.

2. The film spool 22 with the unexposed film roll 54 is inserted into the film take-up chamber 18 as shown in FIGS. 4 and 5, to receive the depending coaxial stem 36 of the film winding thumbwheel 34 in the end opening 38 of the film spool 22 to rotationally engage thumbwheel with the film spool.

3. A rotation tool 56 is coaxially engaged with the film spool 22, as shown in FIG. 4, and is rotated clockwise in that FIG. less than 360 degrees to similarly rotate the film spool, in order to swing a leading end 58 of the unexposed film roll 54 on the film spool partially over the backframe opening 28 (assuming the leading end is not yet positioned over the backframe opening). The thumbwheel 34 then unwindingly rotates with the film spool 22.

4. The leading end 58 of the unexposed film roll 54 on the film spool 22 is threaded to the film supply chamber 24 and into contact with a winding tool 60. The winding tool 60 has suction holes 62 to hold the leading end 58 against the winding tool, and is rotated clockwise in FIG. 6 to prewind the filmstrip 30 from the unexposed film roll 54 on the film spool .22 to form the unexposed film roll 26 in the film supply chamber 24. The thumbwheel 34 then unwindingly rotates with the film spool 22. A trailing end (not shown) of the filmstrip 30 is left attached to the film spool 22.

5. A vacuum suction provided to the suction holes 62 of the winding tool 60 is discontinued and the winding tool is separated from the unexposed film roll 26 in the film supply chamber. The rotation tool 56 is separated from the film spool 22.

7. Finally, the rear cover part 16 and the end cap or bottom lid 32 are connected to the main body part 12. When the end cap 32 is connected to the main body part 12, the pawl ends of 46 and 48 of the anti-backup pawls 40 and 42 engage two of the teeth 50 on the bottom end flange 52 of the film spool 22. The pawl ends 46 and 48 prevent unwinding rotation of the film spool 22, in order to then prevent unwinding rotation of the thumbwheel 34.

The invention has been described with reference to a preferred embodiment. However, it will be appreciated that variations and modifications can be effected by a person of ordinary skill in the art without departing from the scope of the invention. For example, instead of the film spool 22 being used in the film take-up chamber 18, a known film cartridge can be used instead.

PARTS LIST 10. one-time-use camera
12. main body part 14. front cover part
16. rear cover part
18. film take-up chamber
20. bottom loading opening
22. film spool
24. film supply chamber
26. unexposed film roll
28. backframe opening
30. filmstrip
32. end cap
34. film winding thumbwheel
36. depending stem
38. end opening
40. anti-backup pawl
42. anti-backup pawl
44. base plate
46. pawl end
48. pawl end
50. teeth
52. end flange
54. unexposed film roll
56. rotation tool
58. leading end
60. winding tool
62. suction holes

What is claimed is:

1. A one-time-use camera comprising a main body part with a film take-up chamber, a film spool rotatable in said film take-up chamber, a film winding thumbwheel supported for winding rotation in coaxial engagement with said film spool to similarly rotate said film spool to take up an exposed filmstrip, and an anti-backup pawl for preventing unwinding rotation of said thumbwheel, is characterized in that:

said film take-up chamber has a bottom loading opening through which said film spool is longitudinally received in the film take-up chamber;

said film spool has an end flange with a circular array of teeth that face said bottom loading opening, when the film spool is received in said film take-up chamber, to make each one of said teeth simultaneously accessible proximate the bottom loading opening; and a bottom lid is configured to connect to said main body part, over said bottom loading opening, when said film spool is received in said film take-up chamber, to close said film take-up chamber, and said bottom lid supports said anti-backup pawl for the pawl to engage any one of said teeth in order to prevent unwinding rotation of said thumbwheel.

* * * * *